Oct. 13, 1970  L. STRAUCH  3,533,933
PROCESS AND DEVICE FOR THE ISOLATION OF FRACTIONS
OF A SUBSTANCE MIXTURE ELECTROPHORETICALLY
SEPARATED IN A CARRIER GEL
Filed April 1, 1968  2 Sheets-Sheet 1

INVENTOR
LUDWIG STRAUCH
BY
Hammond and Littell
ATTORNEYS

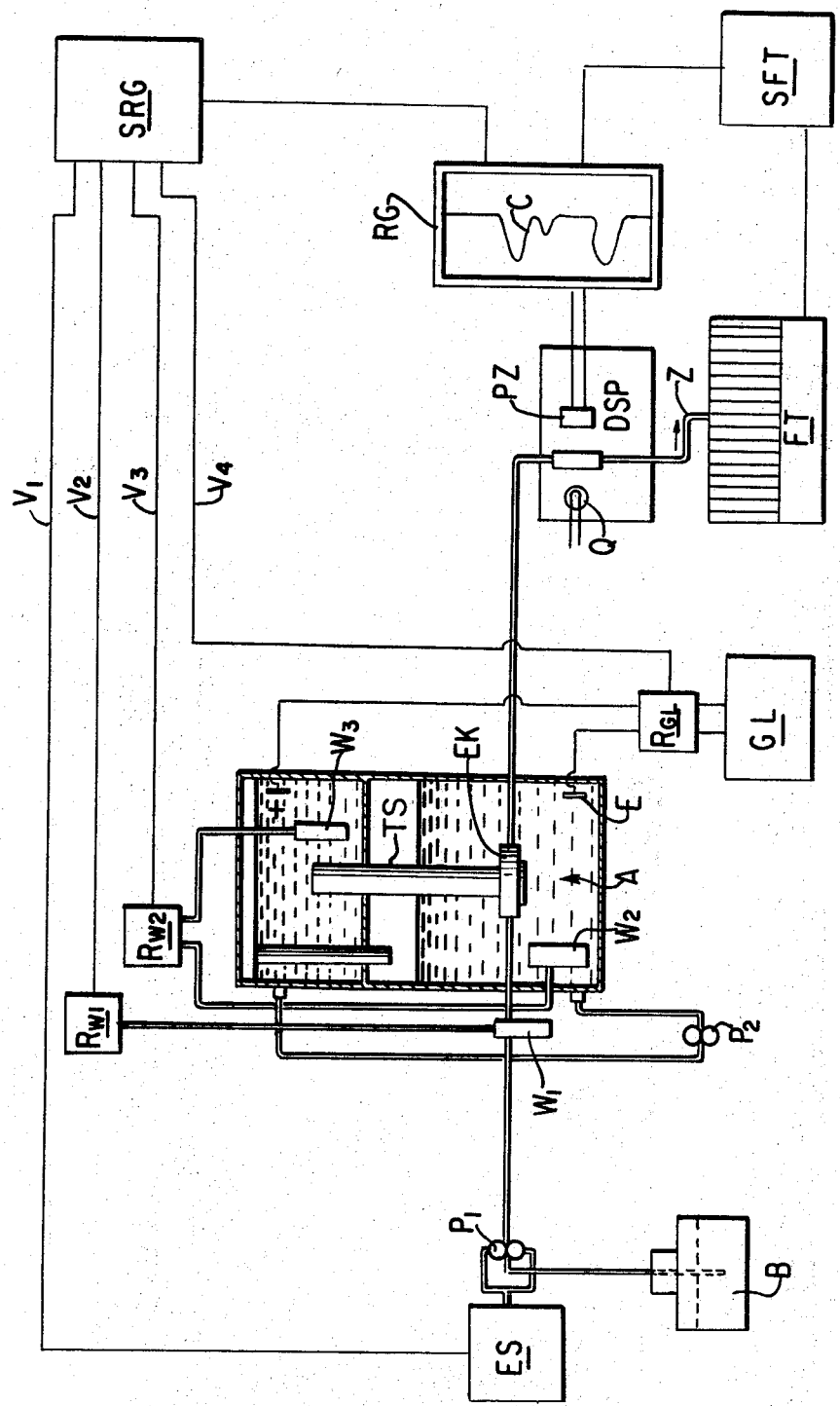

United States Patent Office 3,533,933
Patented Oct. 13, 1970

1

3,533,933
PROCESS AND DEVICE FOR THE ISOLATION OF FRACTIONS OF A SUBSTANCE MIXTURE ELECTROPHORETICALLY SEPARATED IN A CARRIER GEL
Ludwig Strauch, Munich, Germany, assignor to Kurt Hannig, Munich, Germany
Filed Apr. 1, 1968, Ser. No. 718,265
Claims priority, application Germany, Mar. 31, 1967, 1,598,583
Int. Cl. B01k 5/100
U.S. Cl. 204—180
22 Claims

ABSTRACT OF THE DISCLOSURE

This invention relates to the apparatus and process for the quantitative determination and obtaining of product fractions of a mixture of substances which migrate in a carrier material infiltrated by a buffer solution and which are eluted upon emergence from said carrier material and which is characterized in that to the elution liquid is imparted a concentration of substances in said mixtures of substances which is proportional to the true content of the fraction of the substance in the mixture of substances through an adaption of the elution rate to the migration speed of the fraction and the content of the fraction in the mixture is subsequently determined.

THE PRIOR ART

The electrophoretical separation of mixtures of substances in finely cross-linked carrier gels, as for instance, gels from starch, polyacrylamide, gelatin, and proteins, produces, as compared to electrophoresis in solid, porous carriers, such as paper, cellulose acetate, PVC-spheres, glass-powder and others, a much more comprehensive and sharper fractionation since use is made not only of the difference in electrical charge of every individual component of the mixture but also of their difference in molecular size as well, for the separation of the components of the mixture. During the electrophoretic migration through the pores of the three-dimensional gel structure, the larger molecules are slowed as compared to smaller, equally charged molecules by means of the so-called molecular sieve effect. Through this effect, a substance mixture, containing equally charged molecules which, however, are different in size, can be divided into further fractions.

The use of these methods, however, is, up to the present time, restricted to the field of analytical determination only, since the isolation of the fractions from the gel following the electrophoretic separation has not yet been solved in a technically satisfactory way. In most cases, those gel areas, which contain the desired fractions are cut out of the total gel area after the electrophoresis, and the separated substances contained therein are eluted or extracted in a burdensome way and with a poor output. Known devices operate with losses in substances or employ intricate elution systems which result in great dilutions of the extracted fractions.

OBJECTS OF THE INVENTION

It is an object of the invention to develop a device and a process for the quantitative determination and obtaining of product fractions of a mixture of substances which migrate in a carrier material infiltrated by a buffer solution by proper elution.

Another object of the invention is the development of a process for the quantitative determination and

2 obtaining of product fractions of a mixture of substances which comprise the steps of causing a mixture of substances to migrate through a carrier material, infiltrating a buffer solution through said carrier material whereby said mixture of substances are separated into individual fractions during said migration through said carrier material, eluting said separated substances on emergence from said carrier material by means of an elution liquid, adapting the elution rate to the migration speed of said separated substances whereby the concentration of said separated substances in said elution liquid is proportional to the true content of said separated substances in said mixture of substances, and separately recovering said elution liquid containing therein a concentration of said separated substances proportional to the true content of said separated substances in said mixture of substances.

A further object of the invention is the development of a device for the quantitative determination and obtaining of product fractions of a mixture of substances which comprises a separation chamber filled with a carrier material and buffer solution, means for feeding a mixture of substances to be separated at one end of said separation chamber, said mixture of materials to be separated having fractions having separate predetermined migration speeds through said carried material, an elution chamber attached to the other end of said separation chamber, means to feed an elution liquid into and out of said elution chamber, and means to adjust the rate of said feed of said elution liquid through said elution chamber proportionally to said predetermined migration speed of the fractions of said mixture of materials to be separated.

These and other objects of the invention will become more apparent as the description thereof proceeds.

THE DRAWING

FIG. 2 is a schematic cross-section of an extended arrangement of the device of the invention showing various embodiments for varying the rate of flow of the elution liquid proportional to the migration speed of individual fractions of the mixture of substances to be separated.

DESCRIPTION OF THE INVENTION

Figure 1:
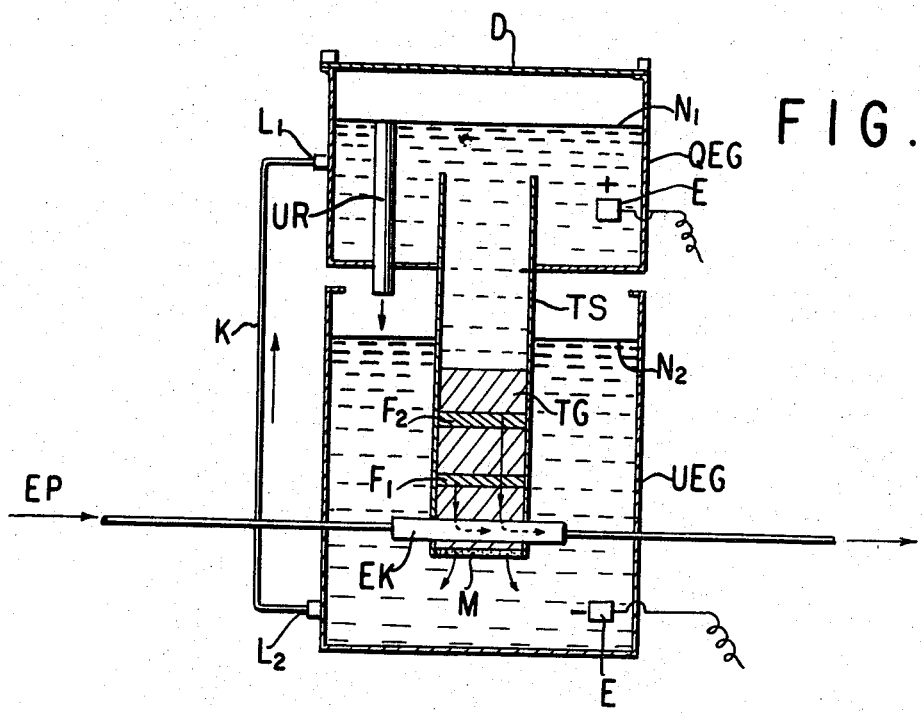
FIG. 1 is a schematic cross-section of the device of the invention utilizing gel-electrophoresis in order to obtain product fractions.

The present invention, therefore, achieves a process and a device with the help of which these disadvantages of the prior art can be overcome and the objects of the invention can be obtained. This invention makes it possible to carry out an exact, quick and certain determination of the extracted fractions of a mixture of substances having varying migration speeds through the carrier material.

According to the invention a process is described for the quantitative determination and obtaining of product fractions of a mixture of substances, each fraction of which migrates in a carrier material infiltrated by buffer solution at a different migration speed and which are eluted upon emergence from the carrier material and which is characterized in that to the elution liquid is imparted a concentration which is proportional to the true content of the fraction in the mixture through adaptation of the elution rate to the migration speed of the fraction and the content of the fraction in the mixture is subsequently determined.

Such a process has the great advantage that the individually collected fractions have a concentration in the elution liquid independent of their migration velocity in the carrier substance and which is proportional to their relative amounts in the original substance mixture. Furthermore, in this manner eluates with a higher concentration may also be obtained with from fractions with a slower migration speed. This causes the substantial advantage that the amount of collected fraction can be determined right away without further process steps.

According to the desired kind of separation of the mixture of substances, the fractions are preferably caused to migrate through the carrier material under the influence of the force of gravity or under the influence of an electrical field or under the influence of a magnetic field or under a combination of two or more of these forces. Therefore, it has proven useful to employ a gel as carrier material, for instance, a starch gel or polyacryamide gel which exercises a molecular trapping effect and thus further influences the migration velocity and intensifies the separation of the individual fractions of the mixture of substances.

It has proven especially useful to adapt the elution rate by varying the flow speed of the elution fluid, for instance, by slowing the flow speed in a ratio of 30:1 during the elution procedure. In some cases it may be equally useful to adapt the elution rate through variation of the electrical current in the electrophoresis and thus to adapt to the emergence rate of the fractions from the carrier material. In addition, such an adaptation of the elution rate can be obtained through variations of the magnetic field through which the emergence rate of the fractions from the carrier material is varied. At the same time, an adaptation of the elution rate can be carried out through change of the temperature of the elution liquid and/or of the temperature of the buffer liquid in the separation chamber.

Another favorable adaptation of the elution rate can be obtained through change of the mixture balance of the elution liquid mixtures by reducing gradually during the course of elution the proportion in the elution liquid mixture of the elution liquid which is suited for a quick elution.

An extremely quick and certain measurement of the amount of eluate can be performed when the elution liquid is allowed to flow through a through-flow registering photometer after the elution procedure and at the same time, varying the replenishment rate of the registering material in the elution liquid in dependence on the migration speed of that respective fraction which is to be measured.

An especially good separation of the individual fractions can be obtained through passing the elution liquid with those fractions dissolved therein into a fraction collector, which contains separate containers, whereby the containers are filled one after the other in time order through a relative motion between the inlet and the containers which is programmed from the control photometer in such a way that upon the obtaining of a threshold value which shows the beginning of a new fraction, a new container is started to be filled.

For the carrying out of the process of the invention, devices are employed which contain an arrangement which makes it possible to program the elution rate in dependence on a predetermined migration velocity of the fractions of the substance mixture. To that end one arrangement has proved especially useful which consists of a pump, the number of revolutions of which, and thus its transport speed for the elution liquid, can be changed continuously and constantly during the elution process, especially its speed can be decreased. Equally successful, a throttle valve can be used as a device to exercise influence on the elution rate. This throttle valve is installed in the feeding line of the elution liquid and is changed continuously and constantly in dependence on the migration velocity of the fractions of the substance mixtures.

Excellent results are also obtained by means of a device in which the contrivance for influencing the elution rate consists of a heat exchanger through which the temperature of the elution liquid or the temperature of the buffer solution in the separation chamber or both is constantly changed in the course of the elution procedure.

An adequate influence on the elution liquid can also be exercised at the same time through a device consisting of a voltage regulator by the help of which the amount of the direct current voltage impressed on the electrodes on both sides of the separation chamber is continuously changed during the elution procedure.

The device for carrying out the process of the invention, furthermore, contains a suitable registering photometer through which the elution liquid is passed and in which the replenishing of the registering material is constantly varied during the entire recording procedure, for instance, in dependence on the number of revolutions of the pump, whose advancing speed for the elution fluid determines the elution rate. Preferably, this control photometer contains a relay, which, upon the exceeding of a predetermined threshold value which indicates the beginning of a new fraction, imparts an intermittent relative motion to the fraction collector between collection containers and feed lines so that each time the predetermined threshold value is reached, the elution liquid is conducted into a new container.

In the following invention will be explained further with the help of drawings, in which:

FIG. 1 is a schematic cross-section of a device for the gel-electrophoresis obtaining product fraction by the process of the invention.

FIG. 2 is, schematically, an extended arrangement for the execution of the process of the invention.

Figure 3:
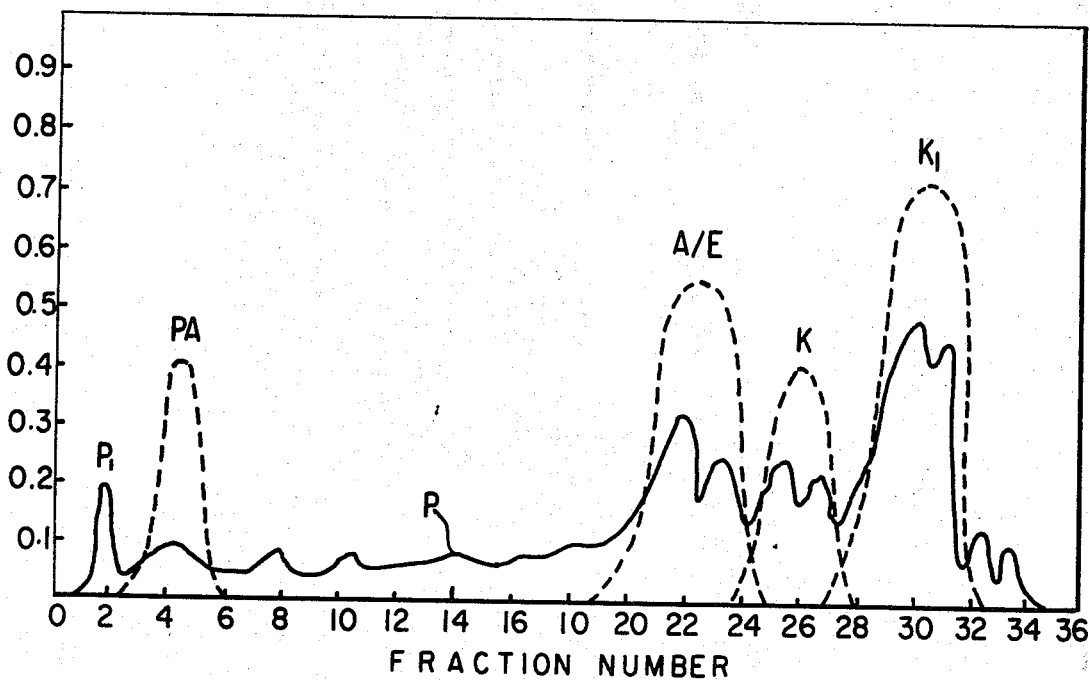
FIG. 3 is a diagram showing the separation of the individual fractions of the mixture of substances to be separated according to the process of the invention.

FIG. 3 is a diagram showing the separation of the fractions of a substance mixture according to the process of the invention.

In FIG. 1, TS denotes a separation column which is filled partially or completely with a carrier gel-TG which, for instance, may consist of starch gel or polyacrylamide gel. At the bottom of the separation column TS, an elution chamber EK is arranged. This elution chamber EK is connected with the separation column TS and preferably its shape is chosen in such a way that its cross-sectional area is larger than the cross-sectional area of the separation column TS and so that only a minimal amount of elution liquid or elution solution EP is necessary for the isolation of the separated fractions. On the side opposite to the separation column TS, a semipermeable membrane M is positioned which is impermeable to those components of the substance mixture which are to be separated.

The upper, open part of the separation column TS projects into an upper electrode chamber OEG, and the bottom of this upper electrode chamber OEG is tightly connected with the wall of the separation column TS. The upper electrode chamber OEG is preferably closed by a lid D.

The lower part of the separation column TS, to which is attached the elution chamber EK which is supplied with a feeding line EP and a discharge pipe for the elution buffer solution, projects into a lower electrode chamber UEG. The upper and the lower electrode chambers may be connected rigidly or detachably or displaceably relative to each other. The upper and the lower electrode chambers are filled with buffer solution up to a height $N_1$ and $N_2$ respectively whereby the height $N_1$ lies above the upper open edge of the separation column TS in order that the buffer solution can flow from the upper electrode chamber OEG through the separation column TS and the semi-permeable membrane M into the bottom electrode chamber UEG. The buffer solution level heights $N_1$ and $N_2$ are maintained by a recycle pipe K, through which by means of a discharge pipe $L_2$ attached at the lower part of the bottom electrode chamber UEG, buffer solution is extracted from the bottom electrode chamber UEG and which by means of feeding line $L_1$ which is attached in the upper electrode chamber OEG below the level height $N_1$ is led into the upper electrode chamber OEG. In addition, the level height $N_1$ of the buffer solution can be adjusted completely exact and constant through an overflow tube UR. By means of this overflow tube UR buffer solution volumes exceeding level $N_1$ are led into the bottom electrode chamber UEG.

In both the upper and the lower electrode chambers, an electrode E is placed in the buffer solution between which the direct current voltage of a direct current voltage source, not shown, can be impressed. The direction of the direct current between the electrodes can be chosen acccording to the substance mixture to be investigated. The positioning of the electrodes E in the upper and lower electrode chambers can be arbitrary; however, it is best to install both electrodes on the middle line of the separation column TS.

For the separation of a substance mixture which is to be investigated, the buffer solution is first brought to the level heights $N_1$ and $N_2$ through switching on the recycle through recycle pipe K. Subsequently, the substance mixture to be investigated is introduced onto the separation column TS. The individual particles of the mixture migrate through the carrier gel TG at different speeds, due to the force of gravity, and during the migration, they separate into fractions such as $F_1$ and $F_2$. Before the first fraction $F_1$ reaches the elution chamber EK, the elution of this chamber is commenced by passage therethrough of the elution solution, so that the individual fractions are absorbed in time order, in this elution solution stream, as soon as they emerge from the carrier gel TG into the solution chamber EK. The elution buffer solution moves perpendicular to the direction of migration of the individual fractions of the substance mixture.

If, simultaneously, a separation of the substance mixture in accordance with electrical or magnetical aspects is desired, then, after putting the substance mixture into the separation column TS, the gravity field is interfered with by an electrical field by passage of a direct current to the electrodes E or by a magnetic field, especially a non-homogenous magnetic field through an installation not shown, so that the substance mixture undergoes an additional separation into different fractions depending upon their electrical charges or charge proportions or their magnetism. In order to prevent damage of the substances to be separated from the Joulean heat which occurs, the buffer solution in the electrode chambers is cooled by means of a cooling coil, not shown in FIG. 1.

In FIG. 2 a schematic cross-section is shown of an exemplified total arrangement for the isolation of fractions of a substance mixture, electrophoretically separated in a carrier gel, and in which, the separation column device TS is employed which was shown in FIG. 1, and which is generally shown as A. As already shown partially by means of FIG. 1, this device is operated so that the recycle K of the buffer solution is adjusted through appropriate choice of the output of pump $P_2$, so that the level heights $N_1$ and $N_2$ remain constant. After filling of the substance mixture into the separation column, a direct current is impressed on the electrodes E, which is produced through a direct current source GL. Before the fraction of the substance mixture which migrates fastest has reached the lowest layer of the carrier gel in the separation column and penetrated to the elution chamber EK, a continuously flowing stream of elution liquid is led through the elution chamber EK until the end of the electrophoresis. This stream of elution liquid is produced by the help of pump $P_1$ which takes elution solution out of the storage container for elution solution B and introduces it to the elution chamber EK.

Those fractions emerging subsequently from the carrier gel into the elution chamber EK, as time goes by, are continuously absorbed into the elution solution and together with this elution solution are led through a through - flow photospectrometer DSP. Through this through-flow photospectrometer DSP, the absorption or the transmittancy of the elution stream flowing through this device is measured constantly by means of a light source Q and an optically sensitive device PZ, such as, for instance, a photocell. At the same time, the observed values are continuously recorded by a recorder RG. In FIG. 2, a recording curve C is indicated schematically. Those extracts emerging from the through-flow recording photometer DSP are eventually collected in individual containers of a fraction separator FT.

With the help of the present device it is not only possible to collect the individual fractions of the starting substance mixture, but it becomes possible at the same time to collect the individual fractions in such a way that every elution liquid fraction collected has a concentration which is in proportion to the genuine proportion of the fraction in the original substance mixture. To this end the elution rate is adjusted to that of the migration velocity of the individual fractions. This, for instance, can be carried out in that the speed of the extraction liquid is changed stepwise for every fraction, occurring chronologically, whereby the extraction rate during the entry of a fraction in the elution chamber EK is kept constant. It is expedient, however, to change the elution rate continuously. This changing of the elution rate, no matter whether stepwise or continuously, is carried out in such a way that every fraction is absorbed by the same amount of extraction solution independent of its migration speed through the carrier material.

Such a programming of the elution rate can be met usefully in that the amount of elution solution which is led through the elution chamber EK is decreased continuously, especially linearly, as time goes by.

To this end, FIG. 2 contains an elution programming rate device ES which programs the output of pump $P_1$ according to a given schedule, which may be supplied in form of a programmed or mechanically obligatory signal, especially one which decreases continuously the rate of flow of the elution liquid. The output of the pump $P_1$ can be decreased, for instance, by varying the speed of revolution of the pump $P_1$.

An adaptation of the elution rate to the migration speed of the fractions can be achieved, however, without a change in time of the amount of the elution solution, in that with a constant amount of elution solution flowing per unit of time through the elution chamber EK, the direct current at the electrodes E is changed continuously, especially increased continuously. So that the time which passes from the entry of the forefront, looking downwards, of fraction layer $F_1$ (see FIG. 1) into the elution chamber EK to the entry of the backfront, looking upwards, of fraction $F_1$, is equally as long as that which elapses while fraction $F_2$ makes its similarly defined entry into the elution chamber EK. This is obtained favorably by a linear increase of the migration speeds of the fractions with time. For the execution of such a step, a regulator $R_{GL}$ is well suited, which is interposed between the direct current source GL and the electrodes E and which changes the voltage supplied to the electrodes E continuously, in particular, increases it.

A similar method can be applied if the fractions are separated in a magnetic field, due to their magnetism. In that case, for instance, the electrical current, through which the magnetic field is created, is adjusted in such a way that, the change of the migration speed of the individual fractions through the same time conditions are fulfilled as in the case of the above-described change of speed on the basis of a varying electrical field.

Another possibility, in order to adjust the elution rate of the fractions, is that, preferably, at constant electrical current on the electrodes E and at constant amount of elution liquid flowing through the elution chamber EK, the temperature of the elution solution is changed. This change of temperature should be carried out in that way so that a greater absorbability of the elution liquid for the fractions or a greater solubility of the fractions in the elution solution results, whereupon an increasingly faster entry of the fractions into the elution solution takes place. The same effect can be obtained through a change of temperature of the buffer solution in the electrode chambers OEG and UEG.

An adaptation of the elution rate to the migration speed of the fractions through a change in temperature of the elution liquid of the buffer solution does not necessarily have to be carried out at a constant electrical current or a constant magnetic field or a constant rate of supply of liquid of the elution solution, but such an adaptation may as well be carried out by simultaneous, continuous or stepwise changes of all factors, described above, or some of these factors.

A continuous or stepwise change of temperature of the elution solution or of the buffer solution can, for instance, be carried out by means of a heat exchanger $W_1$ which is built in the line between the pump $P_1$ and the elution chamber EK or heat exchanger $W_2$ and/or $W_3$ which are installed in the lower and/or the upper electrode chambers OEG and UEG within the buffer solution. By means of regulating devices $R_{W1}$ and $R_{W2}$, respectively, these heat exchangers can be programmed according to a given schedule so that every fraction is absorbed by an equally same amount of elution solution.

Equally, an adaptation of the rate of elution to the migratory speed can be carried out in that the elution solution consists of two or more components, one of which posseses at least for the individual fractions, a greater to far greater absorbability than the other components and that the ratio between constituents, that is, the more absorbable component is continuously varied with reference to that component in the elution solution less absorbable for the fractions. Such a method is most suited when the entire or a greater part of the fractions is absorbed by the better absorbable component and when this component can be separated easily from the other components of the elution solution. Usefully, the mixing proportion of the amounts of both components acting differently is changed linearly, whereby, especially at constant temperature of the elution solution and constant electrical field and/or magnetic field, the amount of that more absorbable component is decreased. However, this method can be applied as well in connection with one or several methods, described above.

In order to obtain a possible optimum adaptation in the range of available, productive possibilities for the change of one variable component, such as the amount of elution solution per unit of time, of the current, or the magnetic field, or the temperature, or the mixing proportion of the elution solution, it is advisable to make first a blank test with only part of the mixture of substances in which way the time is determined during which even the last fraction of the substrate mixture has reached the elution chamber EK. On the basis of this ascertained time the respective control device for the programming of that factor which is to be varied, according to the respective method employed for the adaptation, this device is programmed or else adjusted so that within this measured time, the maximum available change of that respective component is run through. If the changed component happens to be the amount of liquid of the elution solution per unit of time, it is then preferable to carry out such an adjustment of the elution programming rate device ES in that this component is decreased in a ratio of 30:1 during the time of separation.

A blank test for the determination of diffusion time of the substance mixture through the separation column is, however, by no means necessary. On the contrary, the control device for the programming of the changeable component can be adjusted from the very beginning so that the maximum effective change of that respective component is reached at a time which is greater than that which was taken by rough estimation for the substance mixture to flow through the separation column.

Through the present process it becomes possible at the same time to determine the relative share of very individual fraction in the starting substance mixture. This is obtained by direct connection of the control device, for instance, the elution programming rate device ES or the control devices $R_{W1}$ or else $R_{W2}$ or $R_{GL}$ for the programming of the changeable component, with a controller SRG which is signalled by the recorder RG, by means of which the feeding speed of the recording medium in the through-flow recording photometer DSP and recorded on the recording apparatus RG is changed in proportion to the change rate of that component which is to be varied.

In FIG. 2, for instance, the elution programming rate device ES is connected through an electrical connection wire $V_1$, the regulating devices $R_{W1}$ or $R_{W2}$ for the heat exchangers $W_1$ or $W_2$ and $W_3$ are connected through an electrical connection wire $V_2$ or $V_3$ and the voltage regulator $R_{GL}$ for the direct current supply to the electrodes E is connected through an electrical connection wire $V_4$, all with the controller SRG to which is fed regulation signals of the recorder RC.

The relative share of the respective fractions in the substance mixture is determined immediately under these conditions through integration of that area situated under the respective peaks of curve C, and which curve C is produced through photometrization of the extract of a certain fraction.

At the same time, in addition to this quantitative determination of the relative amounts of every fraction in the starting substance mixture, the extract of every fraction can be collected automatically and separated completely from those of the subsequent fractions. This is possible in that the fractionating separator FT (FIG. 2) is controlled by the through-flow recording photometer DSP and the recorder RG in such a way that at reaching of a threshold value of the curve recorded by the recorder RG or, for instance, through those signals given by the photocell PZ, which announces the beginning of a new fraction, the filling of a new container of the fractionating separator FT is started. This is done by means of an impulse which is given at the exceeding of the threshold value which imparts a relative motion between the fractionating separator FT and the end of the inlet pipe Z emerging from the flow-through photospectrometer DSP, which impulse signals the control device SFT of the fractionating separator FT so that the extract of a new fraction flows into a new container.

The efficiency of the process of the invention will be further illustrated by means of the following example which is not to be deemed limitative in any manner.

EXAMPLE

A device similar to that in FIG. 2 in which the adaptation of the elution rate to the migration speed of every individual fraction is obtained solely by a constant linear time change of the rate of flow of the elution solution through the elution chamber was utilized and an isolation of individual enzyme and protein fractions from crude kollagenase (Worthington Biochem. Corp., Freehold, New Jersey, U.S.A., Lot CLS 6488). As electrode buffer solution 3 gm. of Tris+14.4 gm. of glycine buffered with 1 M NaOH to a pH of 9.0 and made up with distilled water to 1000 ml., were employed. The gel buffer consisted of 40 gm. of Tris, dissolved in approximately 500 ml. of distilled water which then with 1 M HCl was brought to a pH of 8.0 and was made up with distilled water to 1000 ml. As carrier gel, 7.5% of polyacrylamide was employed in the gel buffer.

The sample was dissolved in 1 ml. of gel buffer with the addition of glucose and was applied to the carrier gel. The electrophoresis took place under 200 v. and 60 ma. at a temperature of 15° C. for 52 hours. During this time the rate of flow of the liquid of the elution mixture per unit of time was decreased in the ratio of 30:1.

In FIG. 3, P is the curve obtained from the recorder RG which shows the distribution of the proteins. The activities of the enzymes were determined separately in individual fractions. Curve PA=proteinase, curve A/E=amidase/esterase, curve $K_1$=kollagenase 1 (clostridiopeptidase A, EC 3, 4.4.19), curve $K_2$=kollagenase 2, curve $Pi$=pigments.

This example shows clearly that through the present invention a simple and unobjectionable efficient process and elution system has been obtained. At the same time, however, the essential advantage is maintained that the relative concentration of the separated fractions in the extract correspond to those in the gel itself. Thus, elution curves can be obtained which have the appearance of extinction curves as obtained through direct photometrization of their distribution in the gel. At the same time, however, an analytic interpretation of the fractions isolated according to the present invention can be carried out.

The preceding specific embodiment is illustrative of the practice of the invention. It is to be understood, however, that other expedients known to those skilled in art or discused herein may be employed without departing from the spirit of the invention or the scope of the appended claims.

I claim:

1. A process for the quantitative determination and obtaining of product fractions of a mixture of substances which comprises the steps of causing a mixture of substances to migrate through a carrier material, infiltrating a buffer solution through said carrier material whereby said mixture of substances are separated into individual fractions during said migration through said carrier material, eluting said separated substances on emergence from said carrier material by means of an elution liquid, adapting the elution rate to the migration speed of said separated substances whereby the concentration of said separated substances in said elution liquid is proportional to the true content of said separated substances in said mixtures of substances, and separately recovering said elution liquid containing therein a concentration of said separated substances proportional to the true content of said separated substances in said mixture of substances.

2. The proces of claim 1 wherein said mixture of substances is caused to migrate through said carrier material by the influence of gravity.

3. The process of claim 1 wherein said mixture of substances is caused to migrate through said carrier material by the influence of an electrical field.

4. The process of claim 1 wherein said carrier material is a gel exercising a molecular sieve effect.

5. The process of claim 4 wherein said gel is a starch gel.

6. The process of claim 4 wherein said gel is a polyacrylamide gel.

7. The process of claim 1 wherein said adapting of the elution rate to the migration speed of said separated substances is effected through varying the flow speed of said elution liquid in said eluting step.

8. The process of claim 7 wherein said flow speed of said elution liquid in said eluting step is decreased during said eluting step in a ratio of 30:1.

9. The process of claim 3 wherein said adapting of the elution rate to the migration speed of said separated substances is effected through varying the electrical field.

10. The process of claim 1 wherein said adapting of the elution rate to the migration speed of said separated substances is effected through varying the temperature of said elution liquid.

11. The process of claim 1 wherein said adapting of the elution rate to the migration speed of said separated substances is effected through varying the temperature of said buffer solution.

12. The process of claim 1 wherein said adapting of the elution rate to the migration speed of said separated substances is effected through varying the proportion of a mixture of elution liquids by gradually decreasing during said eluting step that part of said elution liquid in which said individual fractions are most adapted for a fast elution.

13. The process of claim 1 wherein said recovery step is effected through a through-flow registering photometer having means to effect the adapting of said elution rate to said migration speed of said separated substances.

14. A device for the quantitative determination and obtaining of product fractions of a mixture of substances which comprises a separation chamber filled with a carrier material and buffer solution; means for feeding a mixture of substances to be separated at one end of said separation chamber, said mixture of materials to be separated having fractions having separate predetermined migration speeds through said carrier material, an elution chamber attached to the other end of said separation chamber, means to feed an elution liquid into and out of said elution chamber, and means to adjust the rate of elution of said elution liquid in said elution chamber proportionally to said predetermined migration speed of the fractions of said mixture of materials to be separated.

15. The device of claim 14 wherein said means to adjust said rate of elution of said elution liquid in said elution chamber proportionally to said predetermined migration speed of the fractions of said mixture to be separated is a pump continuously adjusting the rate of feed of said elution liquid and means to control the output of said pump continuously.

16. The device of claim 15 wherein said means to control the output of said pump continuously, is continuously decreasing the output of said pump.

17. The device of claim 15 wherein said means to control the output of said pump continuously is a throttle valve continuously decreasing the output of said pump.

18. The device of claim 14 wherein said means to adjust said rate of elution of said elution liquid in said elution chamber proportionally to said predetermined migration speed of the fractions of said mixture to be separated is a heat exchanger, means to pass said elution liquid through said heat exchanger before feeding said elution liquid into said elution chamber and means to continuously control the heat input to said heat exchanger.

19. The device of claim 14 wherein said means to adjust said rate of elution of said elution liquid in said elution chamber proportionally to said predetermined migration speed of the fractions of said mixture to be separated is a buffer-solution chamber around said separation chamber and interconnected therewith at both ends, a heat exchanger within said buffer-solution chamber, a buffer solution within said buffer-solution chamber and means to continuously control the heat input to said heat exchanger.

20. The device of claim 14 wherein said means to adjust said rate of elution of said elution liquid in said elution chamber proportionally to said predetermined migration speed of the fractions of said mixture to be separated is a buffer solution chamber around said separation chamber and interconnected therewith at both ends, a buffer solution within said buffer-solution chamber, means to create an electrical field in said buffer-solution chamber and through said separation chamber and means to continuously control said electrical field.

21. The device of claim 14 including a throughflow registering photometer, means to pass said elution liquid out of said elution chamber and through said through-flow registering photometer, said through-flow registering photometer developing a signal which effects said means to adjust said rate of elution of said elution liquid in said elution chamber proportionally to said predetermined migration speed of the fractions of said mixture of materials to be separated.

22. The device of claim 21 including a fraction collector, having individual fraction chamber, means to pass said elution liquid out of said through-flow registering photometer and into one of said individual fraction chambers and means, in association with said registering photometer, to advance said fraction collector when a predetermined threshold value signal is developed by said registering photometer.

References Cited

UNITED STATES PATENTS

| 3,346,479 | 10/1967 | Natelson | 204—180 X |
| 3,373,872 | 3/1968 | Hrdina | 210—198 |
| 3,446,057 | 5/1969 | Bakalyar et al. | 210—31 X |

SAMIH N. ZAHARNA, Primary Examiner